(12) United States Patent
Hayashi et al.

(10) Patent No.: US 11,462,024 B2
(45) Date of Patent: Oct. 4, 2022

(54) TRAFFIC SIGNAL INFORMATION MANAGEMENT SYSTEM

(71) Applicant: Toyota Jidosha Kabushiki Kaisha, Toyota (JP)

(72) Inventors: Yusuke Hayashi, Susono (JP); Taichi Kawanai, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 29 days.

(21) Appl. No.: 16/934,364

(22) Filed: Jul. 21, 2020

(65) Prior Publication Data

US 2021/0027077 A1 Jan. 28, 2021

(30) Foreign Application Priority Data

Jul. 26, 2019 (JP) .............................. JP2019-138004

(51) Int. Cl.
*G06V 10/22* (2022.01)
*G06V 20/58* (2022.01)
*G06V 10/46* (2022.01)

(52) U.S. Cl.
CPC ............ *G06V 20/584* (2022.01); *G06V 10/22* (2022.01); *G06V 10/462* (2022.01); *G06V 2201/07* (2022.01)

(58) Field of Classification Search
CPC ............ G06K 9/00825; G06K 9/2054; G06K 9/4671; G06K 9/03; G06K 9/3233; G06K 2209/21; B60W 50/00; B60W 50/045; B60W 2050/0043
See application file for complete search history.

(56) References Cited

U.S. PATENT DOCUMENTS

| 8,620,032 | B2* | 12/2013 | Zeng | G08G 1/09623 382/104 |
| 9,365,214 | B2* | 6/2016 | Ben Shalom | B60T 7/12 |
| 9,834,218 | B2* | 12/2017 | Rovik | B60W 30/18109 |
| 10,339,805 | B2* | 7/2019 | Yamanoi | G06V 20/584 |

(Continued)

FOREIGN PATENT DOCUMENTS

| JP | 2008-293277 A | 12/2008 |
| JP | 2016-038757 A | 3/2016 |
| JP | 6196044 B2 | 9/2017 |

*Primary Examiner* — Matthew C Bella
*Assistant Examiner* — Kathleen M Broughton
(74) *Attorney, Agent, or Firm* — Dinsmore & Shohl LLP

(57) ABSTRACT

A traffic signal information management system executes a region-of-interest calculation processing to calculate, based on a position information of a vehicle and a traffic signal information indicating the position of a traffic signal, a region of interest in which a traffic signal is presumed to be present in an image imaged by the camera, and also execute a traffic signal image detection processing to detect a traffic signal image included in the region of interest. The traffic signal information management system then execute an evaluation processing to perform a comparison between the position of the region of interest calculated by the region-of-interest calculation processing and the position of the traffic signal image detected by the traffic signal image detection processing and evaluate the certainty of the traffic signal information based on the comparison.

10 Claims, 23 Drawing Sheets

(56) References Cited

U.S. PATENT DOCUMENTS

| | | | |
|---|---|---|---|
| 2012/0249795 A1* | 10/2012 | Ito | G06V 20/584 |
| | | | 348/148 |
| 2013/0211682 A1 | 8/2013 | Joshi et al. | |
| 2013/0253754 A1* | 9/2013 | Ferguson | G06V 20/584 |
| | | | 701/28 |
| 2016/0054138 A1* | 2/2016 | Kojo | G08G 1/09626 |
| | | | 701/423 |

* cited by examiner

*Fig. 2*

<Traffic Signal Information>

| Position [X,Y,Z] | Orientation $[e_x, e_y, e_z]$ | Arrangement of Lights |
|---|---|---|
|  |  |  |
|  |  |  |
| ⋮ | ⋮ | ⋮ |

Fig. 13
<Traffic Signal Information Before Correction>
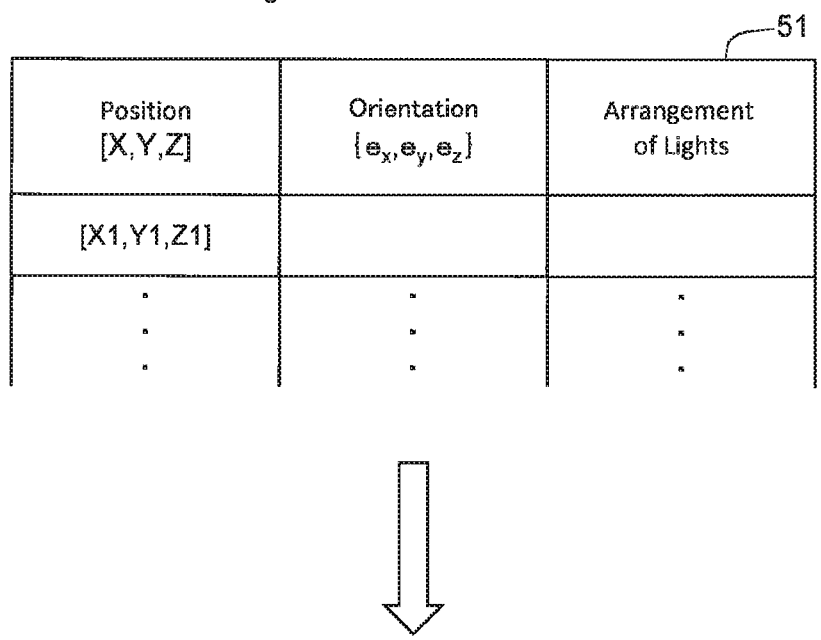
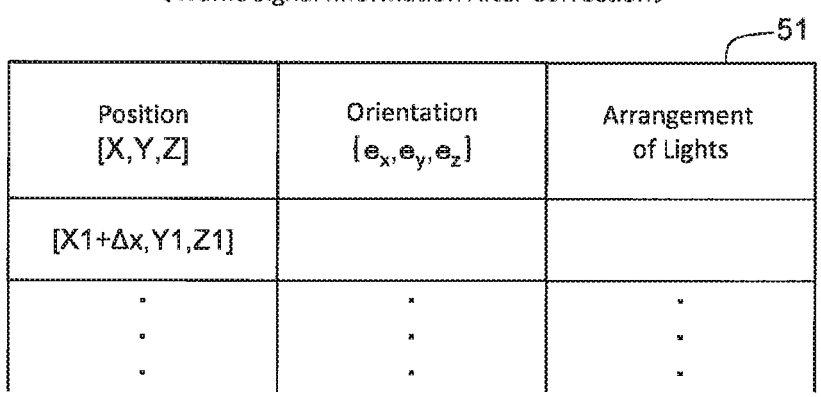
<Traffic Signal Information After Correction>

Fig. 16

<Traffic Signal Information>

| Position [X,Y,Z] | Orientation $[e_x, e_y, e_z]$ | Arrangement of Lights | Evaluation Value |
|---|---|---|---|
|  |  |  |  |
|  |  |  |  |
| ⋮ | ⋮ | ⋮ | ⋮ |

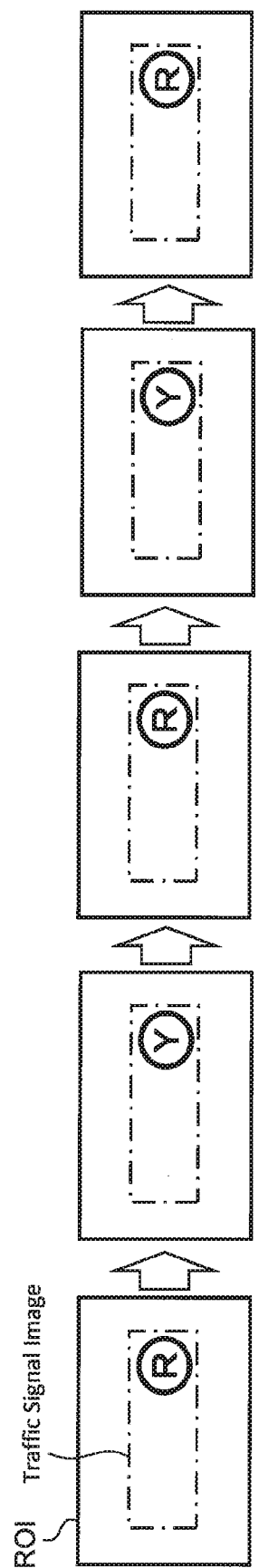

TRAFFIC SIGNAL INFORMATION MANAGEMENT SYSTEM

CROSS-REFERENCE TO RELATED APPLICATION

The present disclosure claims priority under 35 U.S.C. § 119 to Japanese Patent Application No. 2019-138004, filed on Jul. 26, 2019. The content of which is incorporated herein by reference in its entirety.

BACKGROUND

Technical Field

The present disclosure relates to a technique which manages a traffic signal information suitable for use in a driving support control to support the operation of a vehicle.

Background Art

According to a method disclosed in US 2013/0253754 A1, a target region in which a traffic signal is normally positioned is scanned by a camera to acquire a target region information, and the traffic signal is detected from the target region information. Determination of the position of the traffic signal and determination of the display state of the traffic signal are also performed. Determination of the reliability of the traffic signal is further performed. This determination of the reliability is made, for example, by comparing the position of the traffic signal with the position of a plurality of known traffic signals. Furthermore, according to the method described above, the vehicle is controlled in an autonomous mode based on the display state of the traffic signal and the reliability of the traffic signal.

SUMMARY

The control of the vehicle in the autonomous mode disclosed in US 2013/0253754 A1 is one of driving support controls to support the operation of the vehicle. In the driving support control, the position of a traffic signal is used as an important information. Traffic signals can be detected by a camera, and, if a traffic signal information on the position of each traffic signal is stored in a database in advance, the detection range of a traffic signal in a camera image can be narrowed down using the traffic signal information. In other words, the traffic signal information stored in the database is suitable for use in the driving support control. However, the database does not always include only a high-quality traffic signal information. If a low-quality traffic signal information is mixed in the database and the low-quality traffic signal information is used, the accuracy of the driving support control may be lowered.

The present disclosure has been made to address the problem described above, and an object of the present disclosure is to provide a traffic signal information management system that can improve the usefulness of a traffic signal information suitable for use in a driving support control.

A traffic signal information management system according to the present disclosure includes: a camera mounted on a vehicle to image a scene ahead of the vehicle in the traveling direction thereof; a computer linked to the camera; and a storage device coupled to the computer. The storage device includes a traffic signal database including a traffic signal information that indicates the position of a traffic signal. The position of the traffic signal indicated by the traffic signal information is the absolute position in a three-dimensional space.

The computer physically includes a processor and a memory to store a program. The program stored in the memory is configured, when executed by the processor, to cause the computer to execute the following region-of-interest calculation processing, traffic signal image detection processing and evaluation processing.

In the region-of-interest calculation processing, the computer calculates, based on a position information of the vehicle and the traffic signal information, a region of interest in which a traffic signal is presumed to be present in an image imaged by the camera. The position of a camera mentioned here is the absolute position in the three-dimensional space. If the position of a traffic signal with respect to the position of the camera is known, it is possible to identify the region in which the traffic signal is presumed to be present in a camera image. In the traffic signal image detection processing, the computer detects a traffic signal image included in the region of interest. A light that is being turned on may be detected as the traffic signal image. A known image processing (e.g., an image processing using machine learning) can be used to detect a traffic signal image. In the an evaluation processing, the computer performs a comparison between the position of the region of interest calculated by the region-of-interest calculation processing and the position of the traffic signal image detected by the traffic signal image detection processing and evaluate the certainty of the traffic signal information based on the comparison.

The position of the region of interest in the camera image corresponds to the position of the traffic signal in the traffic signal information that is projected into the camera image. On the other hand, the position of the traffic signal image in the camera image corresponds to the position of the traffic signal in the actual three-dimensional space that is projected into the camera image. Ideally, they should coincide with each other, but, when there is a deviation of the position of traffic signal in the traffic signal information from the actual position of the traffic, a deviation may also be generated between the position of the region-of-interest and the position of the traffic signal image, or a variation in the position relationship between them may be generated. Therefore, the comparison between the position of the region-of-interest with the position of the traffic signal image makes it possible to objectively evaluate the certainty of the traffic signal information from the comparison results. Also, if the certainty of traffic signal information can be objectively evaluated, the evaluation results leads to an improvement in the usefulness of the traffic signal information.

In the evaluation processing, the computer may be configured to: execute the region-of-interest calculation processing and the traffic signal image detection processing a plurality of times at different times; use a data acquired as a result of executing the region-of-interest calculation processing and the traffic signal image detection processing the plurality of times to calculate a degree of variation of the position of the traffic signal image with respect to the position of the region of interest; and calculate an evaluation value that indicates the certainty of the traffic signal information from the degree of variation. If the traffic signal information is certain, there should be no variation with time in the positional relationship between the position of the region of interest and the position of the traffic signal image. Thus, by calculating the evaluation value from the degree of variation, it becomes possible to more objectively evaluate the certainty of the traffic signal information.

Also, in the evaluation processing, the computer may be configured to calculate the evaluation value from a margin between an outer border of the region of interest and an outer border of the traffic signal image when the degree of variation is lower than or equal to a designated value. If the position of the traffic signal image is biased with respect to the position of the region of interest even when the position relationship between the position of the region of interest and the position of the traffic signal image is stable, this means that the uncertainty is included in the traffic signal information. Therefore, when the degree of variation is equal to or less than a designated value, it is possible to more objectively evaluate the certainty of the traffic signal information by calculating the evaluation value from the margin.

Moreover, in the region-of-interest calculation processing, the computer may be configured to reduce, by a greater amount, a size of the region of interest calculated from the traffic signal information when the evaluation value assigned to the traffic signal information is higher. What the evaluation value is high means that the deviation between the position of the region of interest in the camera image and the position of the traffic signal is small and the position relationship between them is also stable. Thus, even if the region of interest is reduced, the possibility that the traffic signal may deviate from the region of interest is small. Therefore, by reducing the size of the region of interest, it is possible to reduce the room for the entry into the region of interest of another object that is erroneously detected as a light, thereby increasing the accuracy of detection of the traffic signal image.

The computer may be further configured to execute, based on a result of evaluation by the evaluation processing, a database correction processing to correct the horizontal position, height or depth of the traffic signal in the traffic signal information. The bias or the variation with time of the position of the traffic signal image with respect to the position of the region of interest is caused by the deviation between the position of the traffic signal in the traffic signal information and the actual position of the traffic signal, and the aspect of the deviation between the position of the region of interest and the position of the traffic signal image is determined depending on whether the traffic signal image is shifted to which direction of the horizontal position, height or depth. Therefore, by reflecting the evaluation results performed by the evaluation processing to the traffic signal database, it is possible to eliminate the deviation between the position of the region of interest and the position of the traffic signal image.

Furthermore, the traffic signal information may include an arrangement of lights of the traffic signal. In the database correction processing, the computer may also be configured, when the traffic signal image detected by the traffic signal image detection processing is not consistent with the arrangement of the lights in the traffic signal information, to correct, based on the traffic signal image, the arrangement of the lights in the traffic signal information. The arrangement of the lights in the traffic signal may be changed due to, for example, a change of traffic rules regarding intersections. According to this processing, it is possible to update the arrangement of the lights in the traffic signal information in accordance with the arrangement of the lights of the actual traffic signal. As a result, the traffic signal database can be kept up to date.

As described so far, the traffic signal information management system according to the present disclosure makes it possible to improve the usefulness of the traffic signal information suitable for use in a driving support control.

BRIEF DESCRIPTION OF THE DRAWINGS

FIG. 2 is a conceptual diagram used to describe an example of a traffic signal information according to the embodiment of the present disclosure;

FIG. 13 is a conceptual diagram used to describe an example of a database correction processing according to the embodiment of the present disclosure;

FIG. 16 is a conceptual diagram used to describe an example of a traffic signal information including an evaluation value according to the embodiment of the present disclosure;

FIG. 23 is a schematic diagram used to describe another example of the camera turning based on the evaluation value according to the embodiment of the present disclosure.

DETAILED DESCRIPTION

In the following, embodiments according to the present disclosure will be described with reference to the accompanying drawings. However, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly shown otherwise, or unless the present disclosure is explicitly specified by the structures, steps or the like theoretically.

1. Outline of Driving Support Control System

Figure 1:
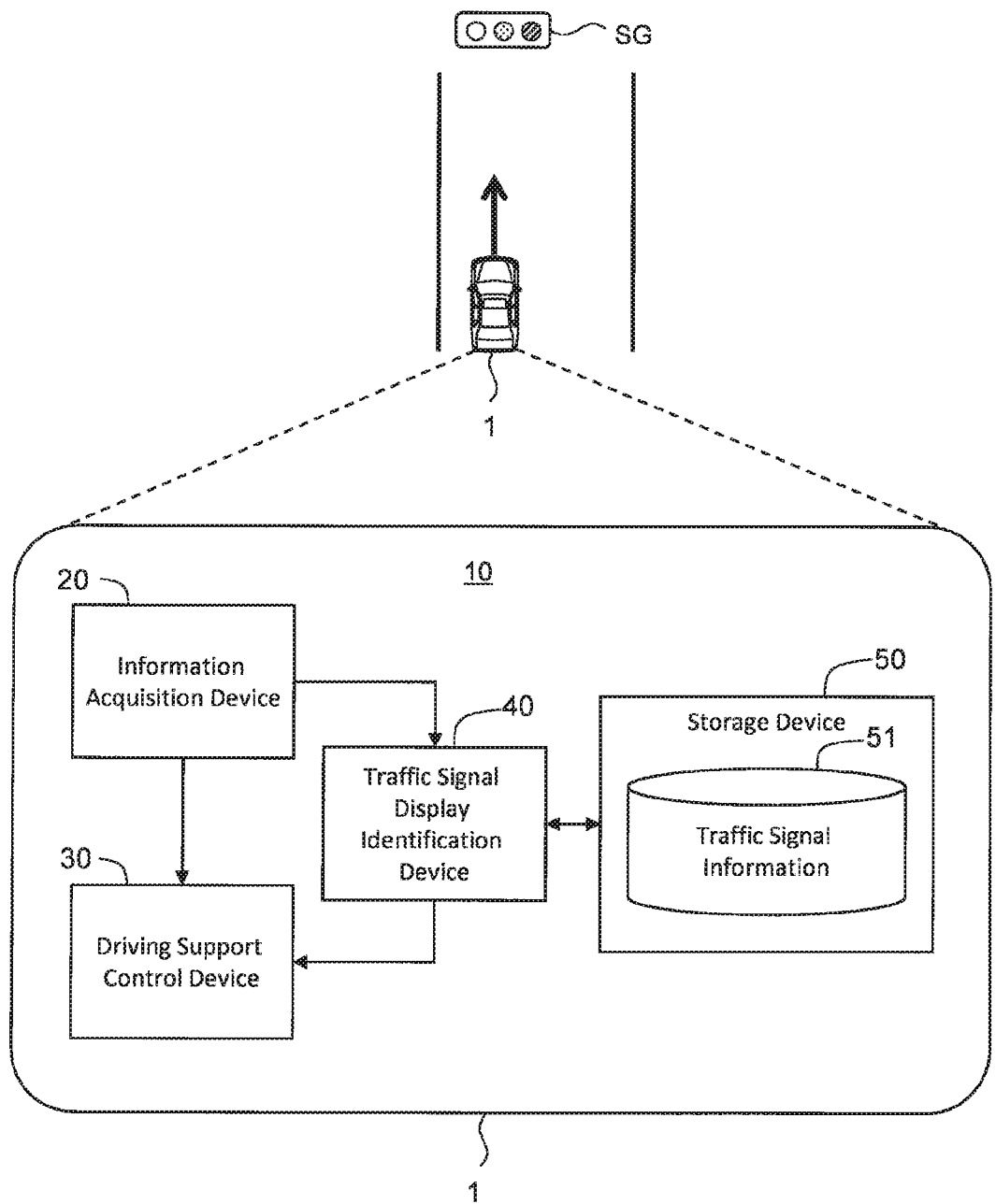
FIG. 1 is a conceptual diagram used to describe the outline of a driving support control system according to an embodiment of the present disclosure.

A traffic signal display estimation system according to the present embodiment is configured as a part of a driving support control system. FIG. 1 is a conceptual diagram used to describe the outline of a driving support control system 10 according to the present embodiment. The driving support control system 10 is a control system configured to achieve a level 3 or more automated driving level in the level definition of, for example, SAE (Society of Automotive Engineers).

The driving support control system 10 includes a driving support control device 30. The driving support control device 30 performs a driving support control for supporting the driving of a vehicle 1. Typically, the driving support control includes at least one of steering control, acceleration control and deceleration control. This kind of driving support control is exemplified by an autonomous driving control, a path-following control, a lane tracing assist control and a collision avoidance control.

The driving support control system 10 includes an information acquisition device 20. In the driving support control, various types of information acquired by the information acquisition device 20 are used. The information acquisition device 20 acquires various types of information using sensors mounted on the vehicle 1 and Vehicle-to-Everything (V2X) communication. The V2X communication includes, for example, Vehicle-to-Vehicle (V2V) communication, Vehicle-to-Infrastructure (V2I) communication and Vehicle-to-Network (V2N) communication. The information acquired by the on-board sensors and the V2X communication includes vehicle position information indicating the position of the vehicle 1, vehicle state information indicating the state of the vehicle 1, and surrounding situation information indicating the situation of surrounding of the vehicle 1, for example. Among those various information, the traffic signal display of a traffic signal SG ahead of the vehicle 1 is one of the pieces of information particularly important in the driving support control.

The driving support control system 10 includes a traffic signal display identification device 40. The traffic signal display identification device 40 has a function of processing the information acquired by the information acquisition device 20 (in detail, a camera image imaged by an on-board camera), a function of using the information of a database 51 stored in a storage device 50, and a function of identifying a traffic signal display of the traffic signal SG located ahead of the vehicle 1. The traffic signal display identified by the traffic signal display identification device 40 is used in the driving support control performed by the driving support control device 30. For example, in accordance with the identified traffic signal display, the driving support control device 30 decelerates the vehicle 1, stops it at a specified position, or restarts it.

2. Traffic Signal Information

The traffic signal display identification device 40 uses traffic signal information to identify a traffic signal display. The traffic signal information is a map information relating to traffic signals SG and indicates the position and orientation of each of the traffic signals SG. The position of the traffic signal indicated by the traffic signal information is the absolute position in a three-dimensional space and is defined in the absolute coordinate system (latitude, longitude and altitude). The orientation of the traffic signal indicated by the traffic signal information is an orientation in the three-dimensional space and is defined by a unit vector. The traffic signal database 51 is a collection of this kind of traffic signal information. As shown in FIG. 1, the traffic signal database 51 is stored in the storage device 50.

FIG. 2 is a conceptual diagram used to describe an example of the traffic signal information according to the present embodiment. In the example shown in FIG. 2, the traffic signal information includes the position of traffic signal (absolute position [X, Y, Z]), the orientation of traffic signal (unit vector ($e_x$, $e_y$, $e_z$)), and the arrangement of lights of traffic signal. That is to say, the position, orientation and light arrangement of a traffic signal SG configures one data set and is registered in the traffic signal database 51. As the arrangement of lights of a traffic signal, in Japan, traffic signals having circular lights of three colors of blue (green), yellow and red are arranged horizontally in a row are common. However, traffic signals having three color lights arranged in the upper stage and one or more blue arrow lights arranged in the lower stage to indicate one or more permitted traveling directions are also common.

3. Traffic Signal Display Identification Processing

Figure 3:
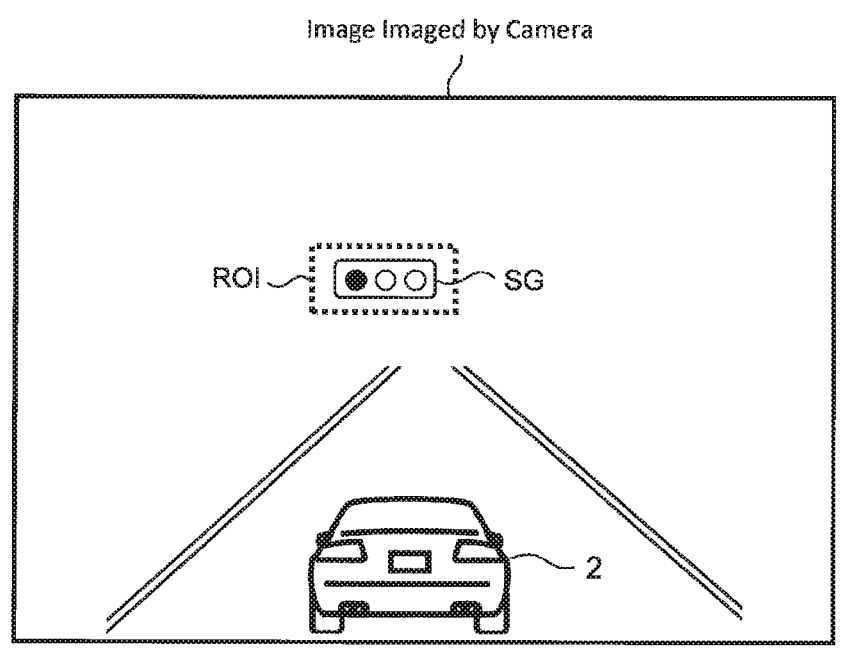
FIG. 3 is a conceptual diagram used to describe a camera image according to the embodiment of the present disclosure.

The outline of a traffic signal display identification processing executed by the traffic signal display identification device 40 will be described. FIG. 3 is a conceptual diagram used to describe a camera image according to the present embodiment. In the example shown in FIG. 3, the camera image includes a traffic signal SG ahead of the vehicle 1 and a preceding vehicle 2. In FIG. 3, the traffic signal SG is represented by three lights arranged horizontally in a row and an outer border. It should be noted that a light represented by a white circle means the light that appears to be turned off in the camera image, and, on the other hand, a light represented by a black circle means the light that appears to be turned on in the camera image. In the camera image exemplified in FIG. 3, the blue light appears to be turned on.

A dotted border in the camera image indicates a region of interest (hereinafter, referred to as "ROI") in the traffic signal display identification processing, i.e., a region in which a traffic signal may be present in the camera image. The absolute position of the camera in the three-dimensional space can be regarded as equal to the absolute position of the vehicle 1 in the three-dimensional space, which can be acquired from a GPS receiver. By referring to the position information of the camera that can be acquired from the GPS receiver (the position information of the vehicle) and the position and orientation of the traffic signal SG included in the traffic signal information, it is possible to narrow down the ROI in accordance with the position and orientation of the traffic signal with respect to the position of the camera. Moreover, it is possible to adjust the ROI in accordance with the arrangement of lights of the traffic signal included in the traffic signal information. This greatly contributes not only to improving the accuracy and stability of the traffic signal display identification processing but also to reducing the amount of calculation required for the traffic signal display identification processing. The traffic signal display identification device 40 calculates, based on the position relationship of a camera and the traffic signal information of the traffic signal database 51, a region of interest in which a traffic signal may be present in the camera image, and sets the ROI in the camera image.

The traffic signal display identification device 40 cuts out a camera image for each of the ROIs which have been set, and detects a light that is being turned on in the cut out ROI image. The detection of the light that is being turned on is performed using image processing by a known machine learning. The method of the machine learning for the traffic signal display identification processing is not limited. For example, a statistical pattern recognition method, such as a Bayesian estimation method or a maximum likelihood estimation method, may be used. Alternatively, deep learning may be used.

The traffic signal display identification device 40 calculates the position of a light that is being turned on in the ROI image, and identify the traffic signal display of the traffic signal from the color and position of the light that is being turned on. The traffic signal display refers to a display of colors of lights defined by traffic regulations. The colors of the lights are basically three colors of blue, yellow and red. It should be noted that, although the color of the light for permission to proceed is "green" in hue, in Japanese laws and regulations, "green" for permission to proceed is described as "blue", and therefore, the color of the light for permission to proceed permission is also described as "blue" in this specification. The traffic signal displays of traffic signals also include a combination of multiple colors of lights. In an example of a traffic signal, which is adopted in Japan, having lights of three colors of blue, yellow and red arranged in the upper stage and a light of blue arrow arranged in the lower stage, the light of blue arrow may be turned on when the light of red color is turned on.

Figure 4:
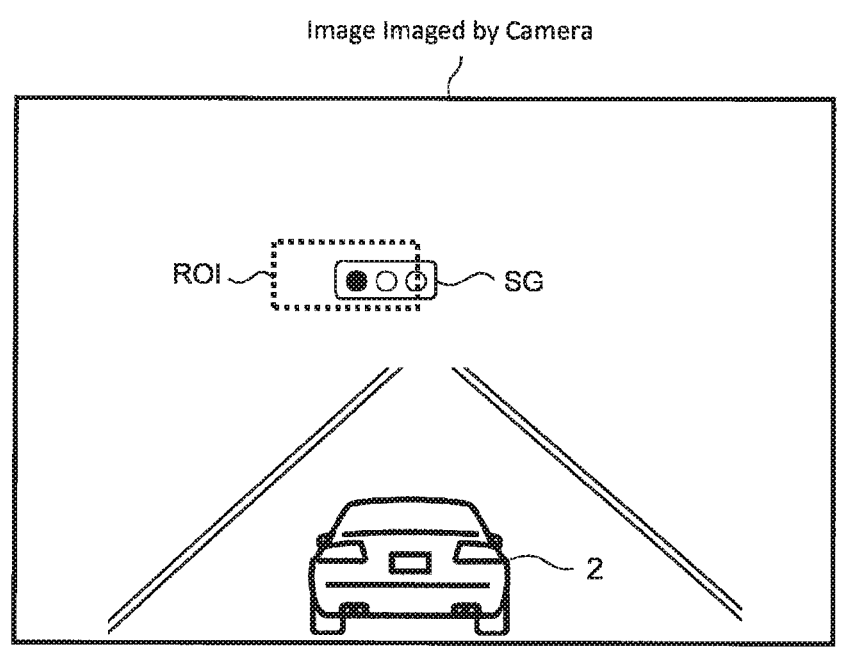
FIG. 4 is a conceptual diagram used to describe an effect of the accuracy of the traffic signal information.

Then, in FIG. 4, similarly to FIG. 3, an example of the camera image imaged by an on-board camera is shown. However, in the example shown in FIG. 3, the traffic signal SG is located wholly within the ROI, and, in the example shown in FIG. 4, a part of the traffic signal SG is located outside from the ROI. More precisely, the ROI is set at a position deviated from the position of the traffic signal SG. If there is a deviation between the position of the traffic signal SG and the position of the ROI, there is a concern that the traffic signal display of the traffic signal SG may not be identified or may be falsely identified.

The issue as described above is caused by the quality of the traffic signal information used for setting the ROI. For example, if the position of the traffic signal in the traffic signal information is shifted in the lane width direction with respect to the actual position of the traffic signal, the position of the ROI in the camera image deviates from the position of the traffic signal SG in the lateral direction thereof. Moreover, if the position of the traffic signal in the traffic signal information is shifted in the height direction thereof with respect to the actual position of the traffic signal, the position of the ROI in the camera image deviates from the position of the traffic signal SG in the vertical direction thereof. Furthermore, if the position of the traffic signal in the traffic signal information is shifted in the lane depth direction with respect to the actual position of the traffic signal, the position of the ROI in the camera image is not fixed with respect to the position of the traffic signal SG and moves regularly. Accordingly, the driving support control system 10 according to the present embodiment is configured to manage the traffic signal information.

4. Configuration of Driving Support Control System

Figure 5:
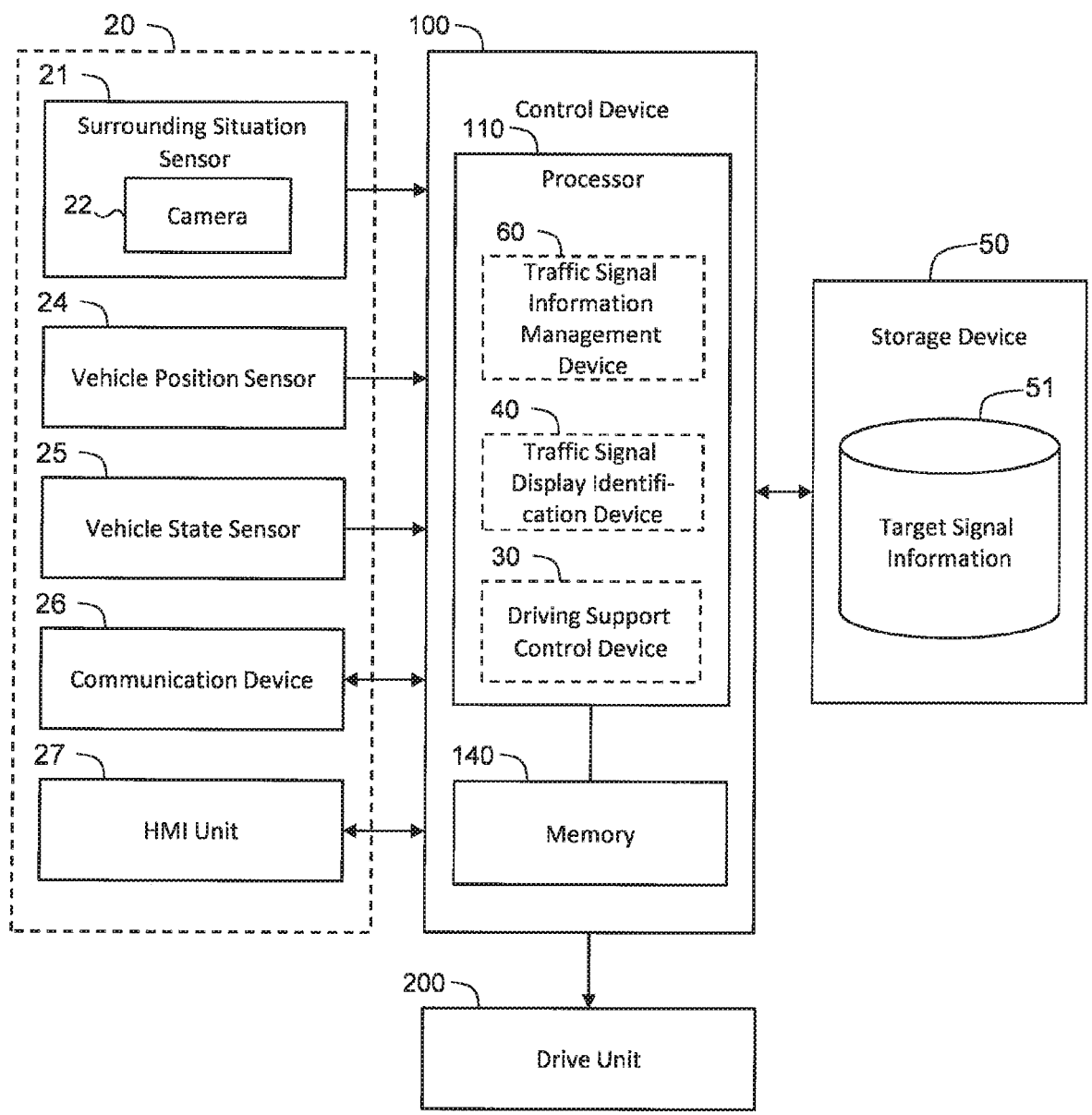
FIG. 5 is a block diagram showing a configuration of the driving support control system according to the embodiment of the present disclosure.

A detailed configuration of the driving support control system according to the present embodiment will be described with reference to FIG. 5. FIG. 5 is a block diagram showing a configuration of the driving support control system 10 according to the present embodiment. The driving support control system 10 includes the information acquisition device 20, a control device 100, the storage device 50 and a travel device 200.

The information acquisition device 20 includes, for example, a surrounding situation sensor 21, a vehicle position sensor 24, a vehicle state sensor 25, a communication device 26 and an HMI (Human Machine Interface) unit 27. These are electrically connected to the control device 100 directly or via an on-board network (a communication network such as CAN (Controller Area Network) built in the vehicle 1).

The surrounding situation sensor 21 detects a situation around the vehicle 1. The surrounding situation sensor 21 is exemplified by a camera 22, a millimeter-wave radar, and an LIDAR. The camera 22 images a scene ahead of the vehicle 1 in the traveling direction. In the configuration shown in FIG. 5, one camera 22 is provided, but the number of cameras may be two or more. The LIDAR uses laser beams to detect a target object around the vehicle 1. The millimeter-wave radar uses radio waves to detect a target object around the vehicle 1.

The vehicle position sensor 24 measures the position and orientation of the vehicle 1. For example, the vehicle position sensor 24 includes a GPS receiver. The GPS receiver receives signals transmitted from a plurality of GPS satellites, and calculates the position and orientation of the vehicle 1 on the basis of the received signals.

The vehicle state sensor 25 acquires information about the state of the vehicle 1. The information about the state of vehicle 1 includes, for example, the velocity, acceleration, steering angle and yaw rate of vehicle 1. In addition, the information about the state of the vehicle 1 also includes driving operation by the driver of the vehicle 1. The driving operation includes accelerator operation, brake operation and steering operation.

The communication device 26 performs a communication with the outside of the vehicle 1 (i.e., a V2X communication) to acquire various types of information. For example, the communication device 26 performs a V2N communication with a communication network. The communication device 26 may also perform a V2I communication with the surrounding infrastructure. The communication device 26 may further perform a V2V communication with the surrounding vehicles.

The HMI unit 27 is an interface device for providing information to the driver and receiving information from the driver. More specifically, the HMI unit 27 has an input device and an output device. Examples of the input device include a touch panel, a switch and a microphone. Examples of the output device include a display device and a speaker.

The travel device 200 includes a steering actuator for steering the vehicle 1, a braking actuator for decelerating the vehicle 1, and a drive actuator for accelerating the vehicle 1. A power steering system using an electric motor or hydraulic pressure, and a steer-by-wire steering system correspond to examples of the steering actuator. A hydraulic brake and a power regenerative brake correspond to examples of the braking actuator. An internal combustion engine, an EV system, a hybrid system and a fuel cell system correspond to examples of the drive actuator. These actuators are electrically connected to the control device 100 directly or via the on-board network.

The control device 100 is an ECU (Electronic Control Unit) including a processor 110 and a memory 140. The memory 140 includes a nonvolatile memory in which at least one program (i.e., a program executable by a computer) and data are stored, and a volatile memory in which the calculation results of the processor 110 and information acquired from each sensor are temporarily stored. The program stored in the memory 140 is executed by the processor 110, thereby causing the processor 110 to operate as the driving support control device 30, the traffic signal display identification device 40 and a traffic signal information management device 60. It should be noted that the ECU configuring the control device 100 may be a group of a plurality of ECUs.

The storage device 50 includes the traffic signal database 51. The storage device 50 is mounted on the vehicle 1, and is electrically connected to the control device 100 directly or via the on-board vehicle network. However, the storage device 50 may alternatively be arranged outside the vehicle 1. For example, the storage device 50 may be located on the Internet and connected to the control device 100 via a wireless communication.

5. Configuration of Traffic Signal Information Management System

Figure 6:
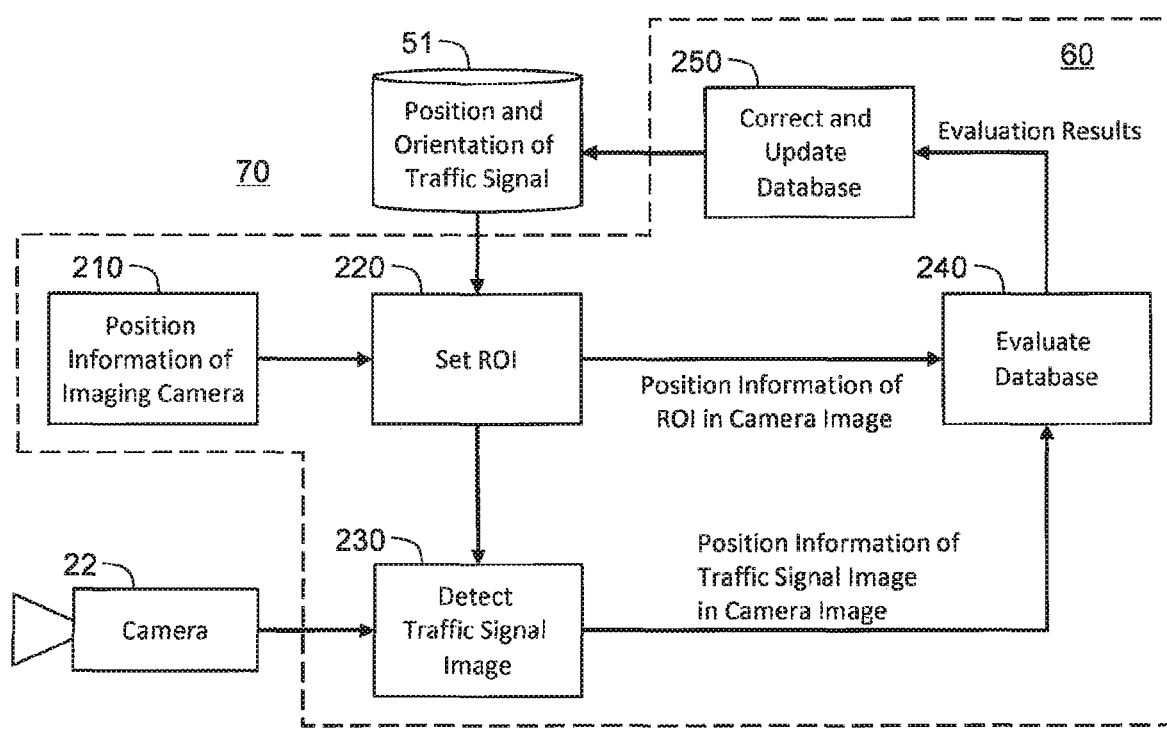
FIG. 6 is a block diagram showing a configuration of a traffic signal information management system according to the embodiment of the present disclosure.

Next, a detailed configuration of the traffic signal information management system configuring a part of the driving support control system 10 will be described with reference to FIG. 6. FIG. 6 is a block diagram showing a configuration of a traffic signal information management system 70 according to the present embodiment. The traffic signal information management system 70 includes the camera 22, the traffic signal information management device 60 and the traffic signal database 51.

The traffic signal information management device 60 is one of the functions achieved by the processor 110 (see FIG. 5) when a predetermined program is executed. The traffic signal information management device 60 may be further divided into a plurality of functions. Each of the functions of the traffic signal information management device 60 is represented as a position information acquisition unit 210, an ROI setting unit 220, a traffic signal image detection unit 230, a database evaluation unit 240 and a database correction unit 250.

The position information acquisition unit 210 acquires the position information of the camera 22. The position information is concerning the absolute position of the camera 22 in the three-dimensional space, which is equal to the position information of the vehicle 1 acquired from the GPS receiver.

The ROI setting unit 220 receives the traffic signal information of the traffic signal database 51 and the position information of the camera 22 acquired by the position information acquisition unit 210. Then, the ROI setting unit 220 executes a region-of-interest calculation processing to calculate, based on those pieces of information, a region of interest (ROI) in which a traffic signal is presumed to be present in the camera image, and sets the ROI.

The traffic signal image detection unit 230 executes a traffic signal image detection processing to detect a traffic signal image included in the ROI. In detail, the traffic signal image detection unit 230 cuts out the camera image imaged by the camera 22 for each of the ROIs which are set by the ROI setting unit 220. Then, the traffic signal image detection unit 230 executes the image processing using the machine learning to detect a light that is being turned on in the cut out ROI image. Alternatively, the traffic signal image detection unit 230 detects both of a light that is being turned on and a light that is being turned off. The light that is being turned off may be detected as a black light. The arrangements of the lights of the traffic signal is known. Thus, if the color and position of the light that is being turned on in the ROI image are known, the traffic signal image can be detected with them as a reference. The array of the lights configuring the traffic signal may be captured as a traffic signal image, or a traffic signal housing calculated or estimated from the array of the lights may be captured as a traffic signal image.

The database evaluation unit 240 receives the position information of the ROI in the camera image that is set by the ROI setting unit 220 and the position of the traffic signal image in the camera image that is detected by the traffic signal image detection unit 230. Then, the database evaluation unit 240 performs a comparison between the position information of the ROI and the position information of the traffic signal image, and evaluate the certainty of the traffic signal information of the traffic signal database 51 based on the comparison. "Certainty" mentioned here can be replaced with terms "likelihood", "accuracy", "reliability" or "availability", and can be quantified. The details of the evaluation processing performed by the database evaluation unit 240 will be described below.

The database correction unit 250 corrects the traffic signal information in the traffic signal database 51 on the basis of the results of evaluation performed by the database evaluation unit 240. The details of a database correction processing performed by the database correction unit 250 will be described below.

6. Evaluation Processing

Hereinafter, an evaluation processing according to the present embodiment will be described in detail. Each of FIGS. 7 to 11 is a diagram showing an example of the position relationship between the ROI and the traffic signal image in the present embodiment. In each figure, the rectangular frame (border) of the solid line shows the ROI, the rectangular frame (border) of the one-dot chain line shows the traffic signal image, the circle of the solid line shows a light that is being turned on, and the circle of the broken line shows a light that is being turned off. In addition, R of the light indicates a red light, Y indicates a yellow light, and G indicates a blue light. It should be noted that, in each figure, it is assumed that the outer border of the traffic signal housing calculated from the position and color of the lights is detected as a traffic signal image.

Figure 7:
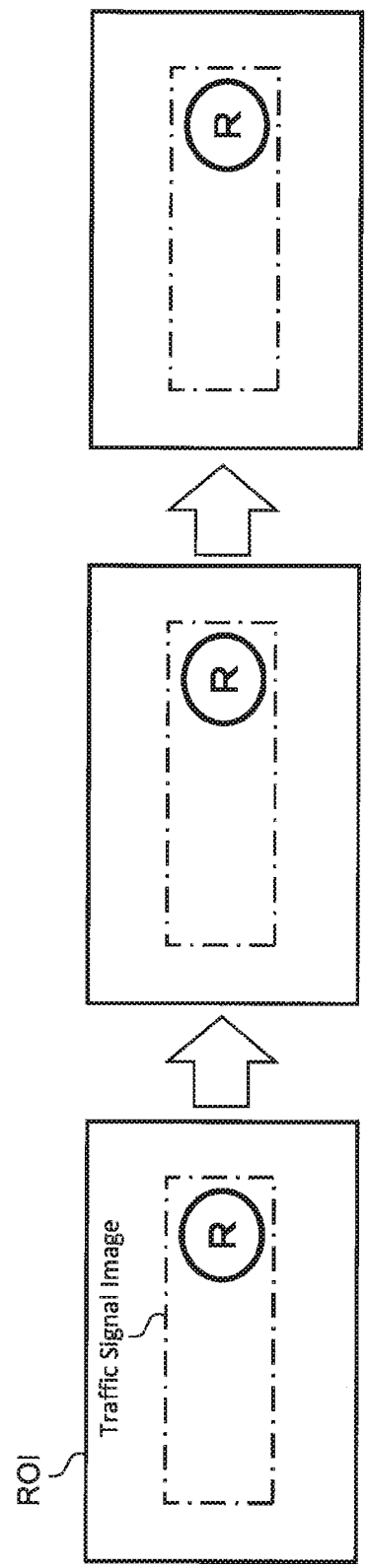
FIG. 7 is a schematic diagram showing an example of the position relationship between an ROI and a traffic signal image according to the embodiment of the present disclosure.

In the example shown in FIG. 7, the traffic signal image is located substantially in the center of the ROI, and also there is no change in position with time. This means that the position of the traffic signal (more specifically, all of the horizontal position, height and depth thereof) in the traffic signal information is accurate. Therefore, the example shown in FIG. 7 is highly evaluated in terms of the certainty of the traffic signal information. A numerical value of the certainty is an evaluation value. Assuming that the evaluation values are integers from 0 to 100, the evaluation value of 100 points, for example, can be given to the example shown in FIG. 7.

Figure 8:
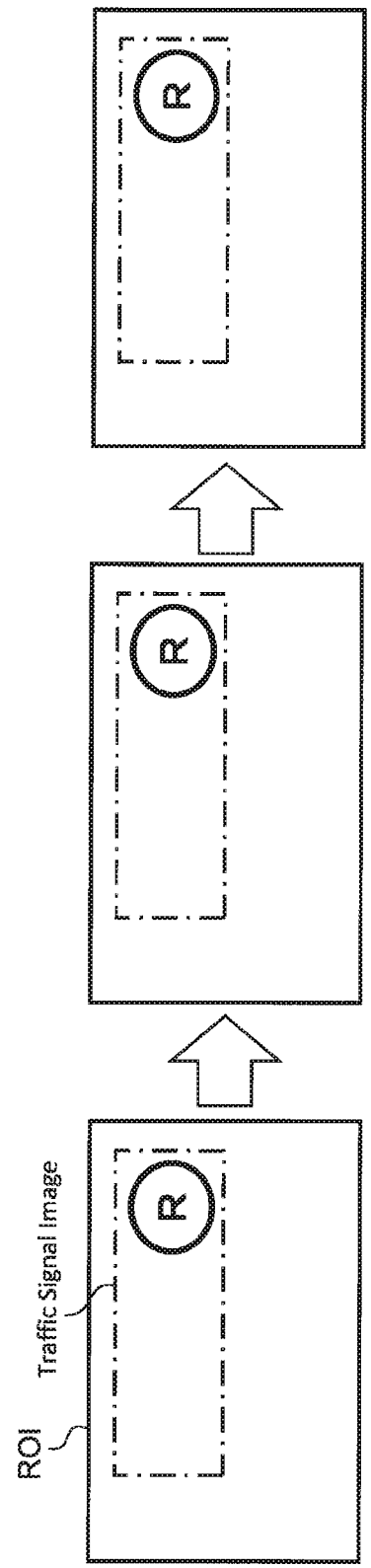
FIG. 8 is a schematic diagram showing another example of the position relationship between the ROI and the traffic signal image according to the embodiment of the present disclosure.

In the example shown in FIG. 8, there is no change in position with time of the traffic signal image with respect to the ROI. However, the position of the traffic signal image is deviated from the center of the ROI to the upper right side, and thus, the left and right difference occurs in the margin between the outer border of the traffic signal image and the outer border of the ROI and the top and bottom difference also occurs. This means that the depth position among the positions of the traffic signal in the traffic signal information is accurate, but the horizontal position and the height are deviated from the actual position. Therefore, with respect to the certainty of traffic signal information, a lower evaluation is given to the example shown in FIG. 8 than that for the example shown in FIG. 7. The evaluation value in this example is calculated depending on the margin between the outer border of the traffic signal image and the outer border of the ROI. That is to say, with as a reference the margin obtained when the traffic signal image is located in the center, the greater the deviation of the left and right margins is, the lower the evaluation value is made. Also, the greater the deviation of the top and down margins is, the lower the evaluation value is made. The evaluation value from 80 points to 99 points, for example, can be given to the example shown in FIG. 8.

Figure 9:
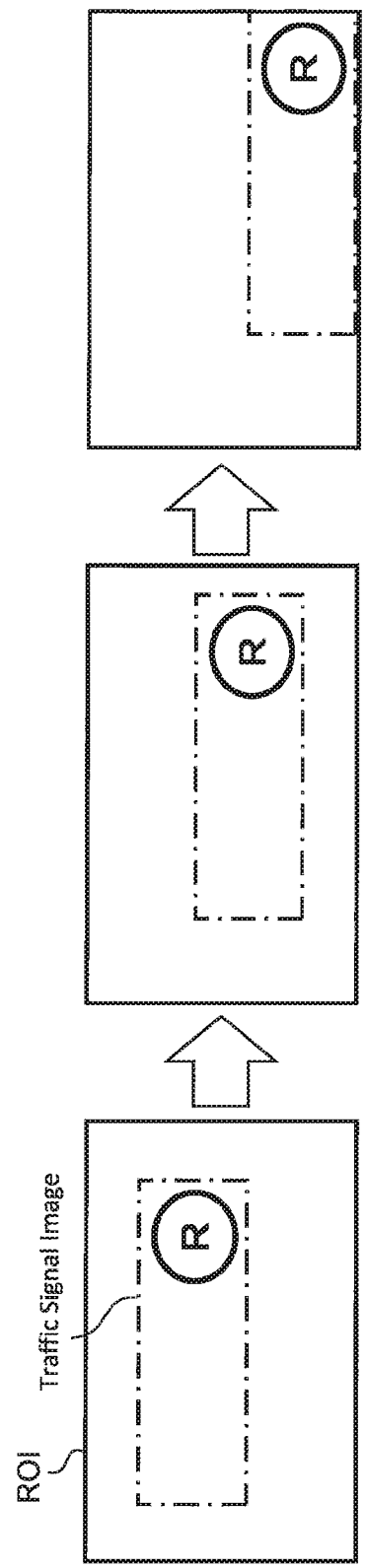
FIG. 9 is a schematic diagram showing still another example of the position relationship between the ROI and the traffic signal image according to the embodiment of the present disclosure.

In the example shown in FIG. 9, the position of the traffic signal image with respect to the position of the ROI varies with time. However, the change is regular, and the traffic signal image moves in approximately one direction in the ROI. This means that at least the depth position among the positions of the traffic signal in the traffic signal information is deviated from the actual position. Therefore, with respect to the certainty of the traffic signal information, a lower evaluation is given to the example shown in FIG. 9 than that for the example shown in FIG. 8. In this example, the degree of variation in a plurality of frames regarding the position of the traffic signal image with respect to the position of the ROI (e.g., variance or standard deviation) is calculated, and the evaluation value is calculated from the degree of variation. More specifically, while using as a reference the example where the position of the traffic signal image with respect to the ROI is stable, the higher the degree of variation is, the lower the evaluation value is made. The evaluation value from 50 points to 79 points, for example, can be given to the example shown in FIG. 9.

Figure 10:
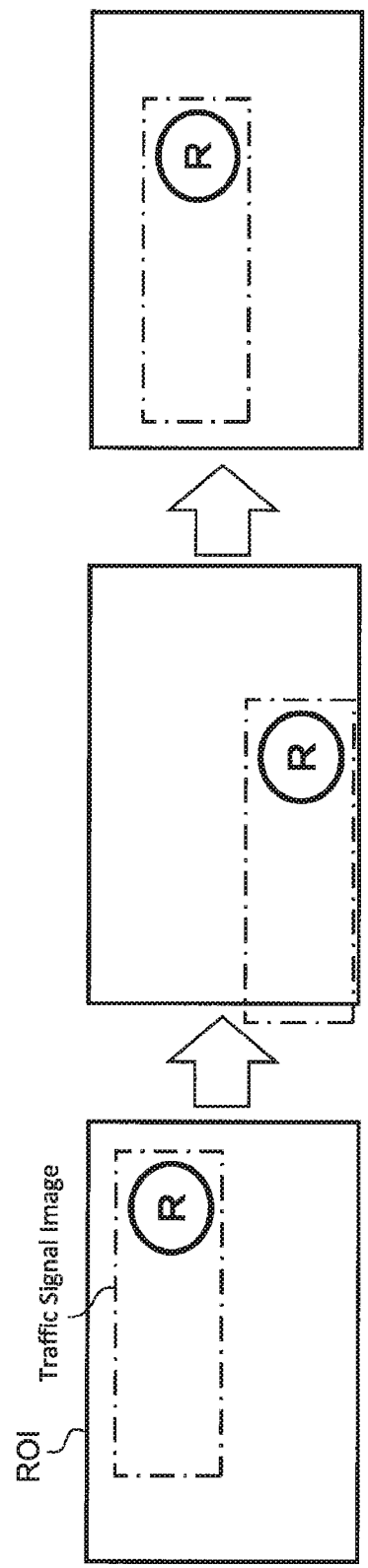
FIG. 10 is a schematic diagram showing yet another example of the position relationship between the ROI and the traffic signal image according to the embodiment of the present disclosure.
Figure 11:
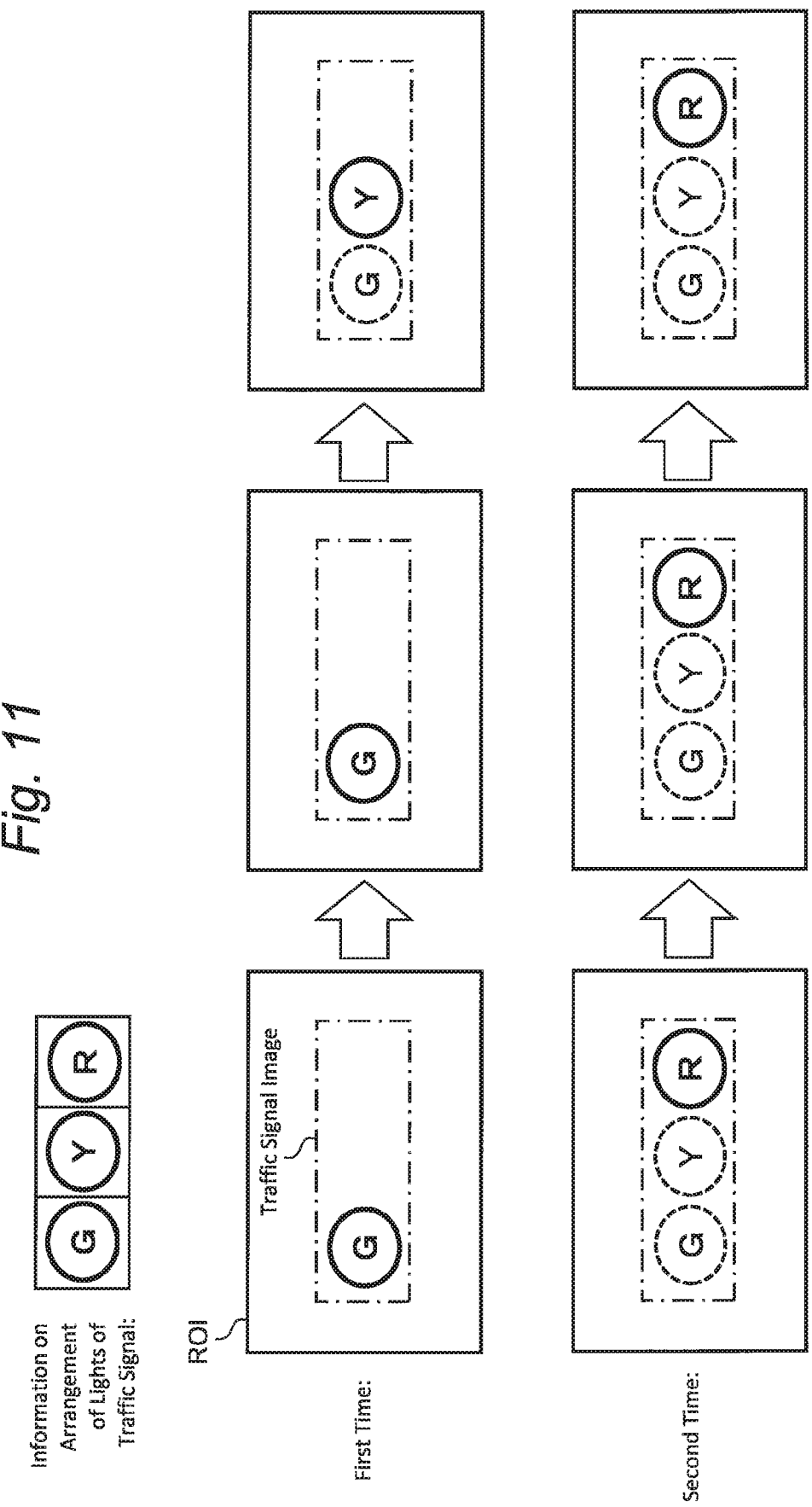
FIG. 11 is a schematic diagram showing still another example of the position relationship between the ROI and the traffic signal image according to the embodiment of the present disclosure.

In the example shown in FIG. 10, the position of the traffic signal image with respect to the position of the ROI varies with time. Also, the change is irregular. In this kind of example, it is likely that both of a light of the traffic signal and a non-traffic signal (for example, a street light) have been detected. In addition, when the light color of the traffic signal repeatedly changes between red and yellow due to the halation of the lights, the light color switches at the same position in the camera image. As a result, the traffic signal image may look like moving irregularly. If, in this example, the change in the position of the traffic signal image with respect to the position of the ROI becomes regular when a part of the lights is ignored, the degree of variation is calculated with the part of the lights ignored and the evaluation value can thereby be calculated from the degree of variation. The evaluation value from 10 points to 49 points, for example, can be given to the example shown in FIG. 10. However, if the irregularity cannot be resolved even when a part of the lights is ignored, 0 point which is the lowest is given as the evaluation value.

According to the evaluation processing exemplified by FIGS. 7 to 10, when one light is detected in the camera image, a traffic signal image is detected from the color and position of the light. However, in order to perform more accurate evaluation, all lights configuring a traffic signal may be detected and then it may be determined whether the color and position of the lights coincided with the arrangement of the lights in the traffic signal information. In the example shown in FIG. 11, the arrangement of lights in which three color lights of blue, yellow and red are located in a row horizontally is registered as the traffic signal information of a traffic signal. Also, in the example shown in FIG. 11, when a vehicle passes this traffic signal for the first time, the lighting of the blue light, the lighting of the blue light, and then the lighting of the yellow light are detected in this order, and when the vehicle passes the same traffic signal for the second time, the lighting of the red light, the lighting of the red light, and then the lighting of the red light are detected in this order. These detected lights are within the same traffic signal image. Because of this, it is possible to give a high evaluation value to the traffic signal information of the aforementioned traffic signal.

Figure 12:
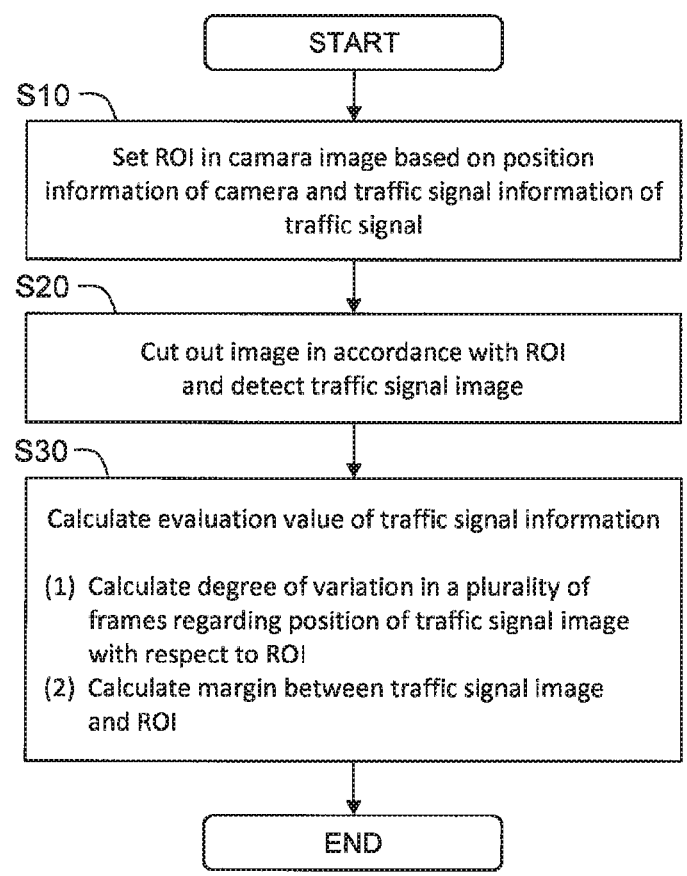
FIG. 12 is a flowchart showing a flow of processing in the traffic signal information management system according to the embodiment of the present disclosure.

The flow of the processing until the evaluation processing performed by the traffic signal information management system 70 according to the present embodiment described above can be summarized as shown in the flowchart in FIG. 12.

In step S10, the traffic signal information management device 60 calculates the relative position and orientation of the traffic signal with respect to the camera on the basis of the traffic signal information of the traffic signal read from the traffic signal database 51 and the position information of the camera obtained from the GPS, and sets the ROI in the camera image.

In step S20, the traffic signal information management device 60 cuts out the camera image in accordance with the ROI that has been set in step S10, and then uses the image processing by the machine learning to detect a light that is being turned on in the cut out ROI. Also, the traffic signal information management device 60 calculates the position of the light being turned on in the ROI image and detects the traffic signal image from the lighting color and position of the light being turned on.

In step S30, the traffic signal information management device 60 calculates an evaluation value of the traffic signal image detected in step S20. First, the traffic signal information management device 60 calculates the degree of variation in a plurality of frames regarding the position of the traffic signal image with respect to the position of the ROI. If the calculated degree of variation is low and the relative position of the traffic signal image with respect to the ROI is stable, the traffic signal information management device 60 then calculates a margin between the traffic signal image and the ROI. Then, the traffic signal information management device 60 calculates an evaluation value on the basis of the calculated degree of variation and the margin.

7. Database Correction Processing

Next, the database correction processing according to the present embodiment will be described in detail. By performing the evaluation processing described above, the certainty of the traffic signal information in the traffic signal database 51 is turned out for each traffic signal is determined. According to the database correction processing, the correction of the traffic signal database 51 is performed on the basis of the evaluation value indicating the certainty of the traffic signal information acquired by the evaluation processing. In detail, as shown in FIG. 13, the correction of any of the lateral position (horizontal position), the height and the depth position in the traffic signal information is performed. In the example shown in FIG. 13, with respect to the traffic signal whose original position is [X1, Y1, Z1], the lateral position thereof is increased by Δx, whereby the position thereof is corrected to the position of [X1+Δx, Y1, Z1].

The correction of the traffic signal database 51 is performed when there is a deviation between the position of the ROI and the position of the traffic signal image, as in the examples shown in FIGS. 8 and 9. In the example shown in FIG. 8 (that is, in the example of the evaluation value being from 80 points to 99 points), by correcting the horizontal position and height in the traffic signal information in accordance with the margin between the outer border of the traffic signal image and the outer border of the ROI, it is possible to reduce the deviation between the position of the ROI and the position of the traffic signal image. In the example shown in FIG. 9 (that is, in the example of the evaluation value being from 50 points to 79 points), first, by correcting the depth position in the traffic signal information, it is possible to stabilize the position of the traffic signal image with respect to the position of the ROI. Then, by correcting the horizontal position or height in the traffic signal information in accordance with the margin between the outer border of the traffic signal image and the outer border of the ROI, it is possible to reduce the deviation between the position of the ROI and the position of the traffic signal image.

In the examples shown in FIGS. 7 and 10, the correction of the traffic signal database 51 is not performed. In the example shown in FIG. 7 (that is, in the example of the evaluation value being 100 points), the position of the traffic signal image with respect to position of the ROI is stabilized and the traffic signal image is located substantially in the center of the ROI. Because of this, it is not necessary to perform the correction of the traffic signal database 51. On the other hand, in the example shown in FIG. 10 (that is, in the example of the evaluation value being from 0 to 49), the cause of the position change is unclear and it is difficult to correct the traffic signal database 51 online. Because of this, the evaluation value and the notification of the abnormality are provided to an administrator.

Figure 14:
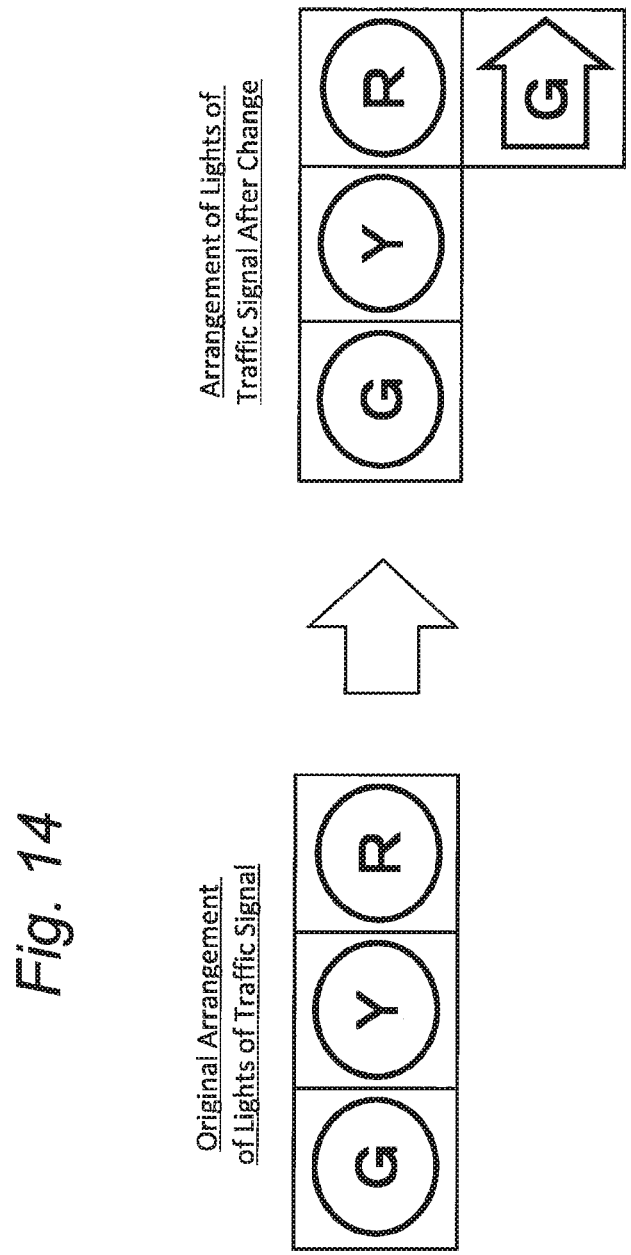
FIG. 14 is a schematic diagram showing an example of arrangements of lights of a traffic signal before and after a change.

The correction of the traffic signal database 51 is performed not only when there is a problem in the accuracy of the original traffic signal information, but also when there is a deviation between the traffic signal information and the actual traffic signal afterward due to a relocation of the traffic signal and a change in the arrangement of the lights thereof. FIG. 14 shows an example in which a traffic signal having three colored lights is replaced with a traffic signal having three colored lights located at the upper stage and a blue-arrow light located at the lower stage. Each arrangement of the lights is prepared in advance as a template.

Figure 15:
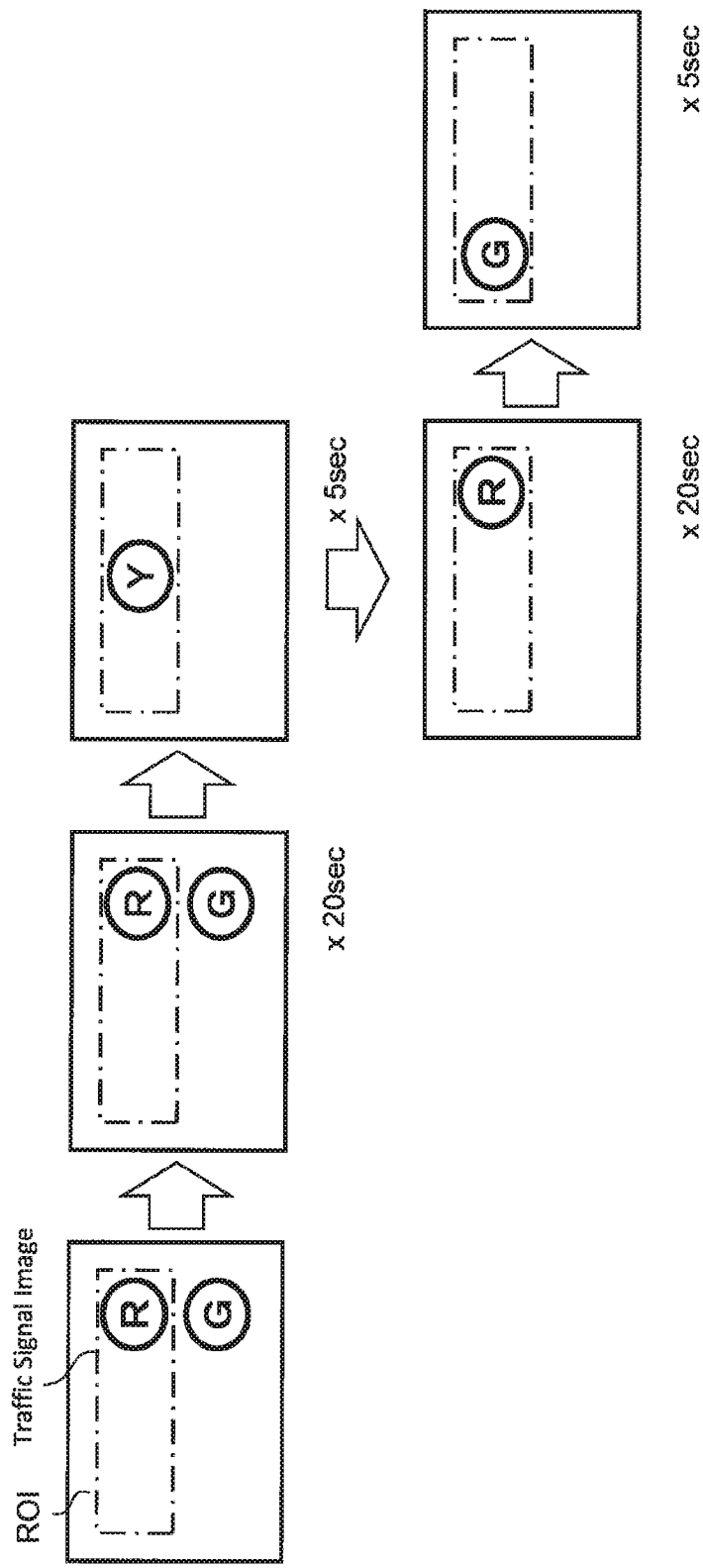
FIG. 15 is schematic diagram showing an example of a detection pattern of lights of a traffic signal according to the embodiment of the present disclosure.

FIG. 15 shows a change with time in the color and arrangement of the lights detected in a traffic signal. If the color and arrangement of the detected lights do not coincide with the arrangement of the lights in the traffic signal information, and the position relationship between the detected lights maintains the same position relationship in an observation performed over a threshold time or longer, it is determined that the arrangement of the lights has been changed. In the example shown in FIG. 15, the blue light is detected outside the border of the traffic signal image and it is observed that the red light inside the border and the blue light outside the border are being turned on simultaneously over the threshold time or longer. Because of this, it can be determined that the arrangement of the lights has been changed. If a change in the arrangement of the lights is turned out, a template that matches the color and arrangement of the newly detected light is searched, and the arrangement of the lights in the traffic signal information is updated in accordance with the template. In other words, the arrangement of the lights in the traffic signal information is updated in accordance with the arrangement of the lights in the actual traffic signal. As a result, the traffic signal database 51 is kept up to date.

8. Traffic Signal Information Including Evaluation Value

The evaluation value calculated in the evaluation processing can also be added to the traffic signal information. FIG. 16 is a conceptual diagram uses to describe an example of the traffic signal information including the evaluation value according to the present embodiment. In the example shown in FIG. 16, the traffic signal information includes not only the position of traffic signal (absolute position [X, Y, Z]), the orientation of traffic signal (unit vector ($e_x$, $e_y$, $e_z$)), and the arrangement of lights of traffic signal but also the evaluation value assigned to the traffic signal display. That is to say, in the example shown in FIG. 16, the position, orientation, arrangement of lights, and evaluation value of a traffic signal configure one data set and are registered in the traffic signal database 51.

9. Example of Using Evaluation Value 9-1. Selection of Traffic Signal Display

There are a plurality of traffic signals at an intersection, for example. The traffic signal display identification device 40 identifies the traffic signal display for each traffic signal. In this situation, if the traffic signal information of each traffic signal is read from the traffic signal database 51 and a traffic signal display having a high evaluation value is preferentially used, it is possible to perform the driving support control more accurately. In other words, by appropriately using the traffic signal information also in consideration of the evaluation value, it is possible to improve the accuracy of the driving support control.

Figure 17:
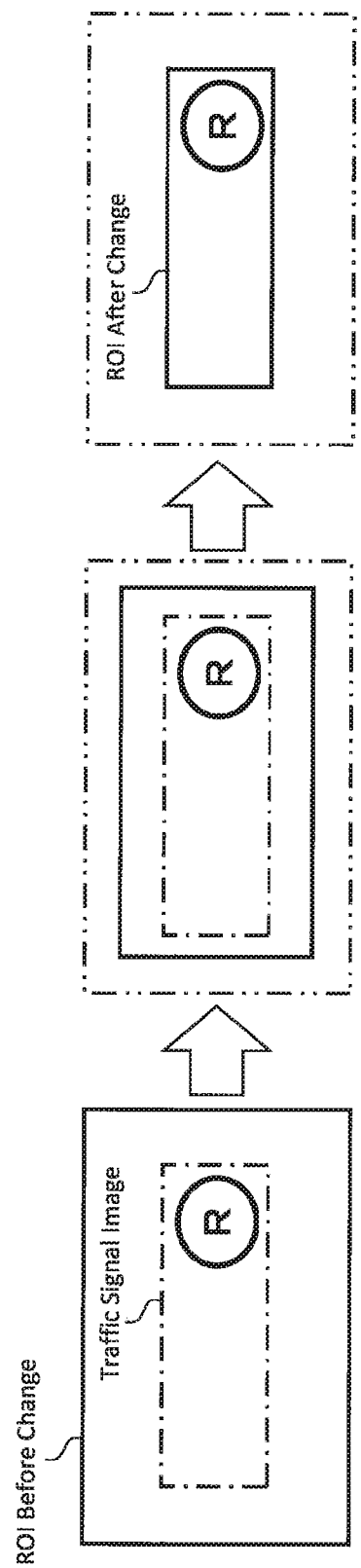
FIG. 17 is a conceptual diagram used to describe an example of the manner of using the evaluation value according to the embodiment of the present disclosure.

9-2. Change of Size of ROI

Where the traffic signal information in the traffic signal database 51 includes the evaluation value, the evaluation value can be used in the setting of the ROI (i.e., in the region-of-interest calculation processing). When, for example, the evaluation value is equal to or higher than a designated value, the size of the ROI may be reduced in proportion to the observation time, as shown in FIG. 17. In addition, the final reduction rate of the ROI may be increased by a greater amount when the evaluation value is higher. What the evaluation value is high means that the position of the traffic signal image with respect to the position of the ROI is stable and the deviation of each of the left and right margin and the top and bottom margin between the traffic signal image and the ROI is small. Therefore, even if the reduction rate of the ROI is increased by a greater amount when the evaluation value is high, the possibility that the traffic signal image may deviate from the ROI is small. By reducing the size of the ROI, it is possible to reduce the room for the entry into the ROI of another target object that is erroneously detected as a light, thereby increasing the accuracy of detection of the traffic signal image.

In changing the size of the ROI, the method of the traffic signal display identification processing may be changed in accordance with the size. If, for example, the size of the ROI is equal to or greater than a threshold value, an image processing using deep learning may be performed, and if the size of the ROI is less than the threshold value, a light that is being turned on and coincides with the previously required light arrangement template may be detected. Furthermore, if the size of the ROI is reduced to substantially the same as the size of the traffic signal image, the lighting of the light may be detected simply by judging whether the brightness exceeds a threshold value without the identification of the color of the light.

9-3. Position Change of ROI

Figure 18:
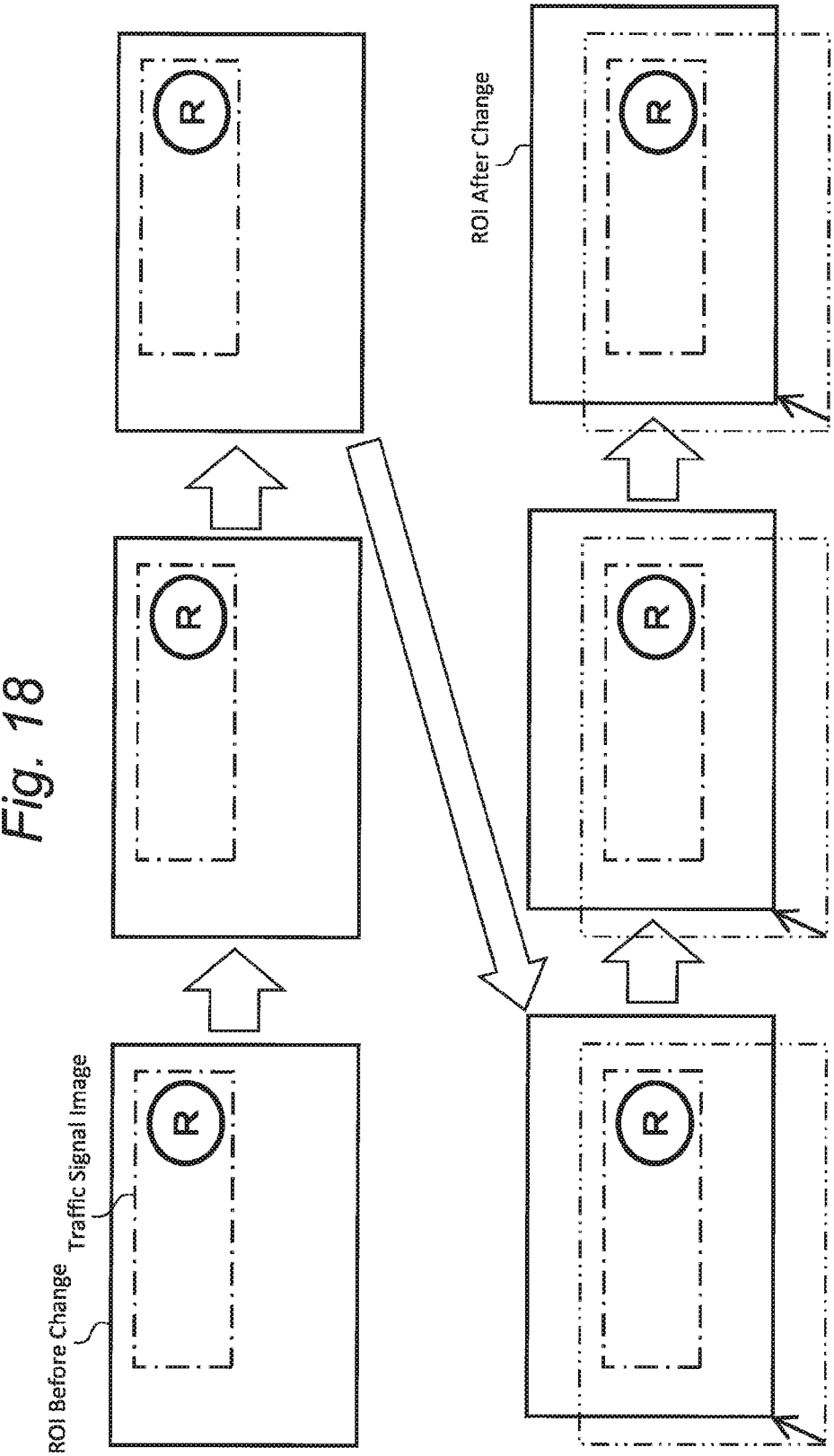
FIG. 18 is a conceptual diagram used to describe another example of the manner of using the evaluation value according to the embodiment of the present disclosure.

If the deviation of the left and right margin or the top and bottom margin between the traffic signal image and the ROI is large, the ROI cannot be greatly reduced. In this example, after the stable position relationship between the traffic signal image and the ROI is observed more than a threshold number of times, the ROI may be offset horizontally or vertically such that the traffic signal image is located in the center of the ROI, as shown in FIG. 18. In the example shown in FIG. 18, the ROI is offset in each of the right direction and the upward direction. It should be noted that, the above-described size change of the ROI may be performed immediately after the deviation of each of the left and right margin and the top and bottom margin between the traffic signal image and the ROI is reduced by the position change of the ROI.

9-4. Elimination of Target Object Other than Light

Figure 19:
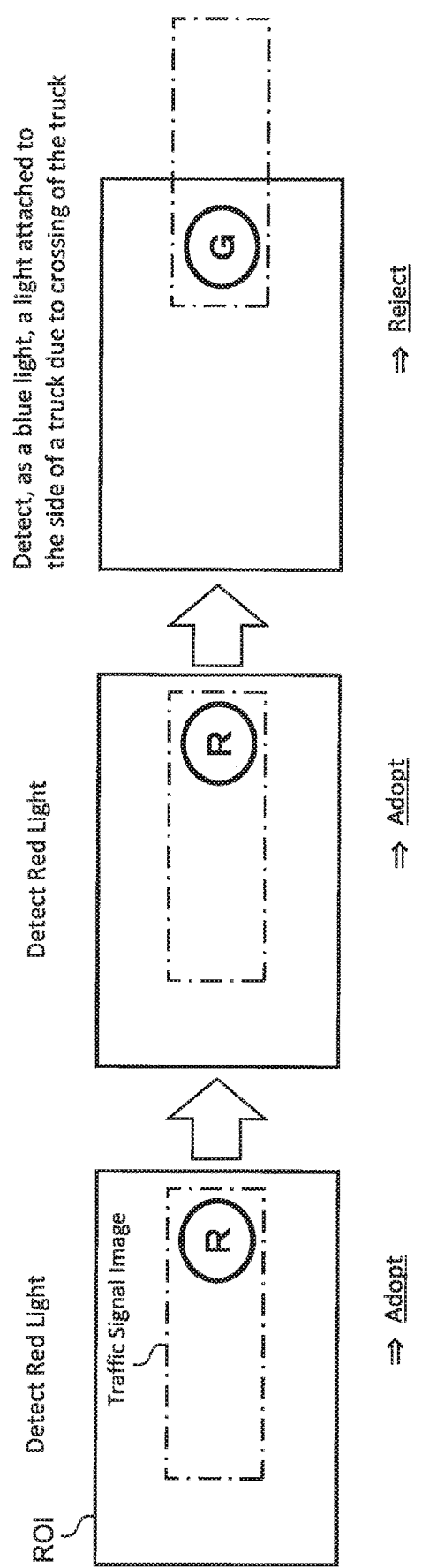
FIG. 19 is a conceptual diagram used to describe still another example of the manner of using the evaluation value according to the embodiment of the present disclosure.

When the evaluation value is high, the position of the traffic signal image with respect to the position of the ROI is stable. Therefore, if, in a traffic signal whose evaluation value should be high, the traffic signal image calculated from the position of the detected light deviates from the ROI, it is highly likely that the light is not a light of the traffic signal. For example, in the example shown in FIG. 19, although the lighting of the red light has been detected in the past two frames, the lighting of the blue light is detected at the current time. However, the position of the detected blue light is the position where the red light is originally turned on. In this example, it is highly likely that a light attached to the side of a truck has been falsely detected as the blue light due to a crossing of the truck in front of the traffic signal. Therefore, the blue light detected at the current time can be rejected as a target object other than the light of the traffic signal.

9-5. Registration of Falsely Detected Object

Figure 20:
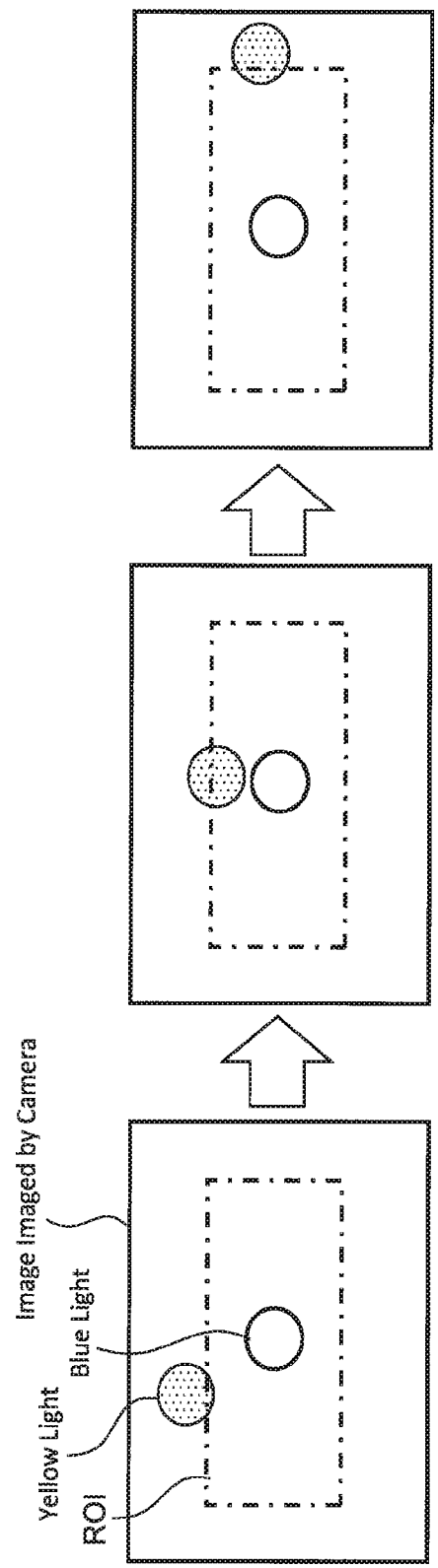
FIG. 20 is a schematic diagram showing an example of a falsely detected object displayed on a camera image.

FIG. 20 is a diagram showing an example of a falsely detected object displayed on a camera image. In the example shown in FIG. 20, a blue light and a yellow light are shown. The blue light is located within the ROI, and the change of the position with time is small. On the other hand, the position of the yellow light changes for each frame, and a part of the yellow light protrudes from the ROI. When, as just described, the arrangement of the lights does not coincide with the traffic signal information and a plurality of detected lights are present and the position relationship between the plurality of detected lights is irregular, a light whose position in the ROI is stable is treated as a light of the traffic signal, and another light whose position in the ROI is not stable is registered in the traffic signal database 51 as a falsely detected object.

Figure 21:
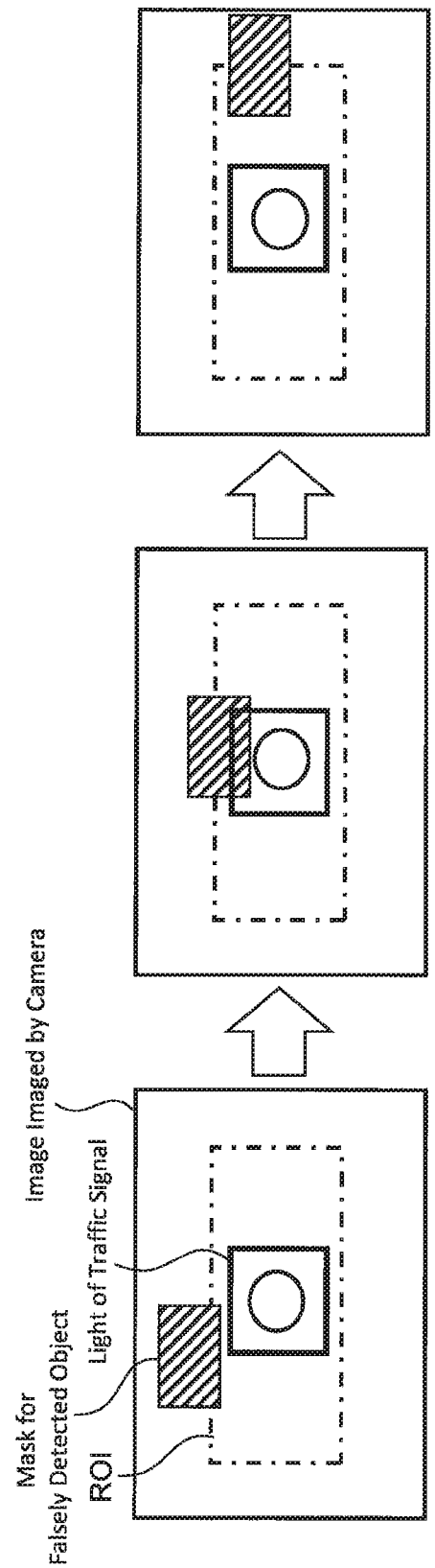
FIG. 21 is a schematic diagram showing an example of processing regarding the falsely detected object according to the embodiment of the present disclosure.

In the example shown in FIG. 20, the blue light is determined as a light of the traffic signal because the position in the ROI is stable. The position of the yellow light is calculated using three measured points, and is registered in the traffic signal database 51 as a falsely detected object. At the time of the identification of the traffic signal display using the traffic signal database 51, as shown in FIG. 21, a mask is applied to the existence region of the falsely detected object which is registered. This mask eliminates the detection of the yellow light and reduces the deterioration of the accuracy of identification of the traffic signal display due to the influence of the falsely detected object.

9-6. Performance Evaluation of Camera

Figure 22:
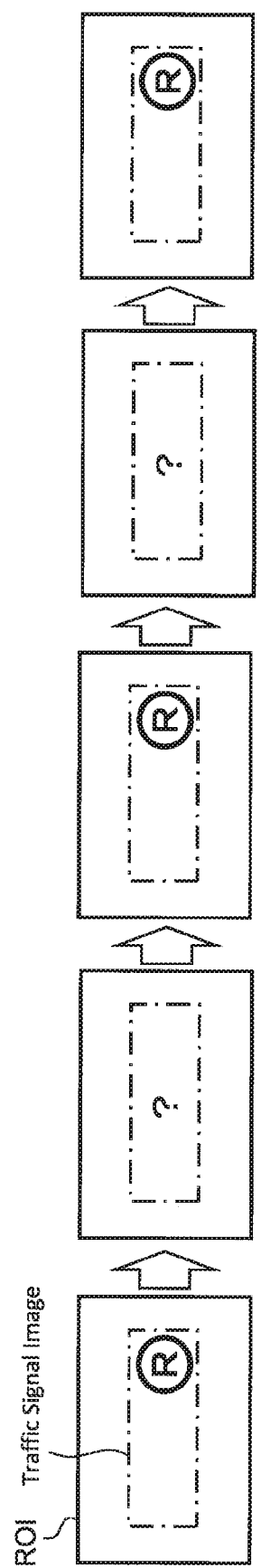
FIG. 22 is a schematic diagram used to describe an example of a camera turning based on the evaluation value according to the embodiment of the present disclosure.

In the example shown in FIG. 22, detection and non-detection of the light is repeated. In this example, if, in the raw image of the detection location at the time point when the light is detected, there is an increase or decrease in brightness (i.e., twinkling of the light), the camera can be evaluated to be greatly affected by the flicker. If the effect of flicker is large, it is possible to weaken the effect of flicker by increasing the exposure time of the camera.

In the example shown in FIG. 23, the position of the detected light is the same between the frames, but the color of the light changes each time the frame changes. In this example, it can be evaluated that the camera is greatly affected by the halation. The magnitude of the effect of halation can be determined from, for example, the presence or absence of hunting in the results of identification of the color of the light (i.e., alternately repeating red and yellow as in the example shown in FIG. 23), or a change in the average value of the color of the detection portion of the light, or the difference in the average value of the color of the light center portion and the light outer edge portion. If the influence of the halation is large, the influence of the halation can be reduced by changing the gain and the aperture of the camera.

All of the above-described performance evaluations of the camera are premised on that the evaluation value is high and the position of the traffic signal image with respect to the position of the ROI is stable. In addition, if the evaluation value is high, it is possible to correct the results of identification of the light even when the influence of the halation is large. In detail, when hunting occurs between red and yellow in the results of identification of the color of the light and it can be judged that the hunting is caused by the influence of the halation, the results of identification can be corrected. When the detected light is located to the right of the ROI image, the light can be determined to be a red colored light regardless of whether the identified color is red or yellow. If, on the other hand, the light is located in the center of the ROI image, the light can be determined to be a yellow colored light regardless of whether the identified color is red or yellow.

It should be noted that, when a high evaluation value is obtained even if the size of the ROI is reduced, a light may be detected by determining which bulb area has a greater number of pixels having a brightness exceeding a threshold value, and then, evaluation of the effect of the flicker described above or evaluation of the effect of the halation may be performed for the detected light. Furthermore, in an example in which a plurality of cameras are mounted, when there is a difference in the evaluation value between the cameras, only the camera having a high evaluation value may be used for the performance evaluation.

What is claimed is:

1. A traffic signal information management system comprising:
   a camera mounted on a vehicle to image a scene ahead of the vehicle in a traveling direction thereof;
   a computer linked to the camera; and
   a storage device coupled to the computer,
   wherein the storage device includes a traffic signal database including traffic signal information that indicates a position of a traffic signal, and
   wherein the computer is configured to:
   execute a region-of-interest calculation processing to calculate, based on position information of the vehicle and the traffic signal information, a region of interest in which a traffic signal is presumed to be present in an image imaged by the camera;

execute a traffic signal image detection processing to detect a traffic signal image included in the region of interest; and execute an evaluation processing to perform a comparison between a position of the region of interest calculated by the region-of-interest calculation processing and a position of the traffic signal image detected by the traffic signal image detection processing and evaluate certainty of the traffic signal information based on the comparison of the position of the region of interest in the image imaged by the camera and the position of the traffic signal image, wherein, in the evaluation processing, the computer is configured to:

execute the region-of-interest calculation processing and the traffic signal image detection processing a plurality of times at different times;

use data acquired as a result of executing the region-of-interest calculation processing and the traffic signal image detection processing the plurality of times to calculate a degree of variation of the position of the traffic signal image with respect to the position of the region of interest; and calculate an evaluation value that indicates the certainty of the traffic signal information from the degree of variation, wherein the evaluation value is inversely correlated to the degree of variation.

2. The traffic signal information management system according to claim 1, wherein, in the evaluation processing, the computer is configured to calculate the evaluation value from a margin between an outer border of the region of interest and an outer border of the traffic signal image when the degree of variation is lower than or equal to a designated value.

3. The traffic signal information management system according to claim 2, wherein, in the region-of-interest calculation processing, the computer is configured to reduce, by a greater amount, a size of the region of interest calculated from the traffic signal information when the evaluation value assigned to the traffic signal information is higher.

4. The traffic signal information management system according to claim 1, wherein the computer is further configured to execute, based on a result of evaluation by the evaluation processing, a database correction processing to correct a horizontal position, height or depth of the traffic signal in the traffic signal information.

5. The traffic signal information management system according to claim 4, wherein the traffic signal information includes an arrangement of lights of the traffic signal, and wherein, in the database correction processing, the computer is configured, when the traffic signal image detected by the traffic signal image detection processing is not consistent with the arrangement of the lights in the traffic signal information, to correct, based on the traffic signal image, the arrangement of the lights in the traffic signal information.

6. The traffic signal information management system according to claim 1, further comprising:

calculating a margin between the traffic signal image and the region of interest; and calculating the evaluation value further based on the margin.

7. A server comprising:

a computer; and a storage device coupled to the computer, the storage device including a traffic signal database including traffic signal information that indicates a position of a traffic signal, and wherein the computer is configured to:

execute a region-of-interest calculation processing to calculate, based on position information of the vehicle and the traffic signal information, a region of interest in which a traffic signal is presumed to be present in an image imaged by a camera of a vehicle;

execute a traffic signal image detection processing to detect a traffic signal image included in the region of interest; and execute an evaluation processing to perform a comparison between a position of the region of interest calculated by the region-of-interest calculation processing and a position of the traffic signal image detected by the traffic signal image detection processing and evaluate certainty of the traffic signal information based on the comparison of the position of the region of interest in the image imaged by the camera and the position of the traffic signal image, wherein, in the evaluation processing, the computer is configured to:

execute the region-of-interest calculation processing and the traffic signal image detection processing a plurality of times at different times;

use data acquired as a result of executing the region-of-interest calculation processing and the traffic signal image detection processing the plurality of times to calculate a degree of variation of the position of the traffic signal image with respect to the position of the region of interest; and calculate an evaluation value that indicates the certainty of the traffic signal information from the degree of variation, wherein the evaluation value is inversely correlated to the degree of variation.

8. The server according to claim 7, wherein the computer is further configured to:

calculate a margin between the traffic signal image and the region of interest; and calculate the evaluation value further based on the margin.

9. A method for evaluating traffic signal information, the method comprising:

obtaining a position of a region-of-interest in which a traffic signal is presumed to be present in an image imaged by a camera, which is calculated based on position information of the vehicle and traffic signal information that indicates a position of the traffic signal;

obtaining a position of a traffic signal image in the region of interests;

comparing the position of the region-of-interest and the position of the traffic signal image; and evaluating certainty of the traffic signal information based on the comparison of the position of the region of interest in the image imaged by the camera and the position of the traffic signal image, wherein the evaluating the certainty of the traffic signal information comprises:

calculating a degree of variation of the position of the traffic signal image with respect to the position of the region of interest based on positions of the region-ofinterest and positions of the traffic signal image in the region of interest obtained at different times; and calculating an evaluation value that indicates the certainty of the traffic signal information from the degree of variation, wherein the evaluation value is inversely correlated to the degree of variation.

10. The method according to claim 9, further comprising:

calculating a margin between the traffic signal image and the region of interest; and calculating the evaluation value further based on the margin.

* * * * *